Feb. 20, 1951     E. L. RICHARDSON     2,542,262

ELECTROSTATIC PRECIPITATOR

Filed Aug. 30, 1947

INVENTOR
Earl L. Richardson
BY Robert T. Palmer
Attorney

Patented Feb. 20, 1951

2,542,262

UNITED STATES PATENT OFFICE 2,542,262

ELECTROSTATIC PRECIPITATOR

Earl L. Richardson, Hyde Park, Mass., assignor to Westinghouse Electric Corporation, East Pittsburgh, Pa., a corporation of Pennsylvania Application August 30, 1947, Serial No. 771,556

4 Claims. (Cl. 183—7)

1

This invention relates to electrostatic precipitators for the removal of foreign particles such as dust, from gases such as air.

A successful electrostatic precipitator for the removal of dust from air, is of the type disclosed in the G. W. Penney Patent No. 2,129,783 in which ionizing chambers in which the dust particles are electrostatically charged, are followed by collector chambers in which the charged dust particles are attracted to, and deposited upon, oppositely charged collector plates.

This invention provides a collector cell for the collector chamber of such an electrostatic precipitator, which is a self-contained unit with the grounded collector plates supported from structural end plates, and with the insulated collector plates supported from the supports for the grounded ones. A number of such cells can be used for providing any desired size of collector chamber, and are easily removable and replaceable for cleaning and servicing.

Features of the invention are that the collector cell can be manufactured at less cost than prior cells, and that the collector plates of the cell are maintained tightly in contact with their supports for providing good electric contact therewith, and uniform spacing between the plates.

Another feature of the invention is that the collector plates are wedged against bars which are enclosed in flattened, rounded side tubes which offer less resistance to the flow of gas to be cleaned, and which are more easily cleaned, than the channel type spacers used in the past.

One object of the invention is to reduce the cost of collector cells for electrostatic precipitators.

Another object of the invention is to provide a collector cell for an electrostatic precipitator in which the collector electrodes are tightly secured to their supports for providing the proper spacing and good electric contact.

The invention will now be described with reference to the drawing, of which:

2

Figure 1:
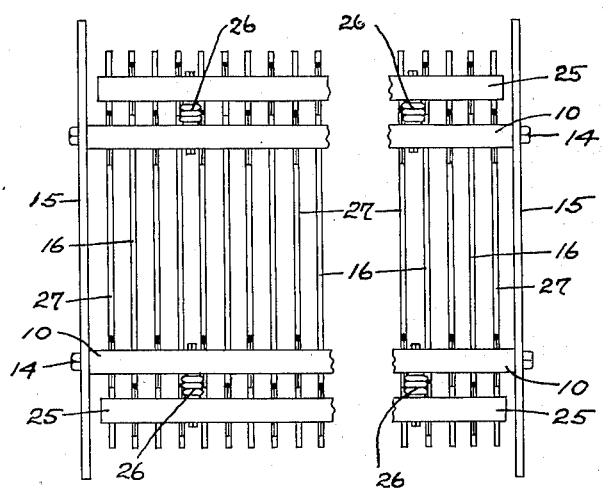
Fig. 1 is a partial side elevation of a collector cell embodying this invention.
Figure 2:
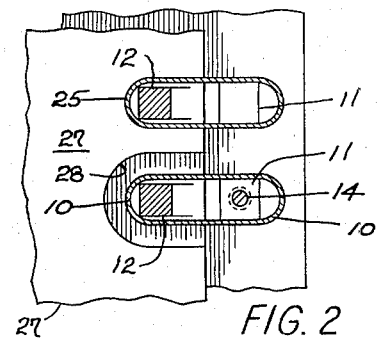
Fig. 2 is an enlarged fractional view illustrating one of the end plates, one of the insulated collector plates, and the supports for the insulated and grounded collector plates.
Figure 3:
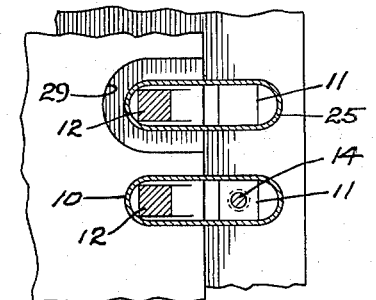
Fig. 3 is a view similar to Fig. 2 but illustrating a portion of one of the grounded collector plates instead of an insulated collector plate.
Figure 5:
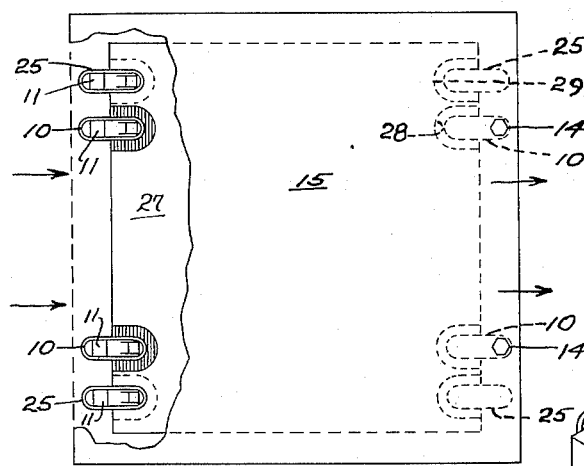
Figure 6:
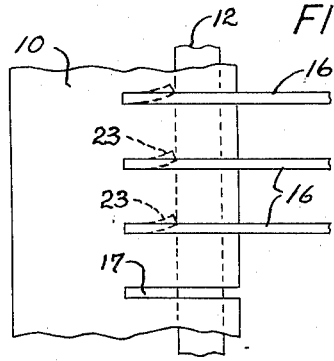
Figure 7:
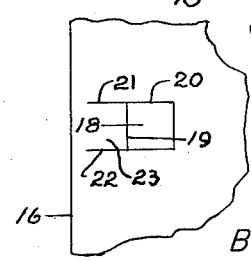

Fig. 5 is an end elevation with a portion of one of the end plates removed, of the cell;

Fig. 6 is an enlarged fractional view illustrating how the collector plates are held in their supporting bars, and Fig. 7 is an enlarged fractional view of one of the collector plates, and illustrates one of the rectangular openings therein for the reception of a supporting bar, and one of the spring tabs formed therein for gripping the supporting bar.

The flattened tubes 10 have semi-circular upstream and downstream sides, and enclose the bars 11 and 12, each of which, in the embodiment of the invention illustrated, is square. The upstream and two downstream tubes 10 are used, the direction of gas flow being indicated by the arrows of Fig. 5.

The bars 11 are placed in the tubes 10 and are brazed or spot welded thereto. The ends of the bars 11 have the tapped openings 13 therein in which are threaded the machine screws 14 which bolt the bars 11 to the end plates 15.

The bars 11 and 12, and the tubes 10 support the grounded collector plates 16 from the end plates 15. The downstream tubes 10 have the spaced transverse slots 17 in their upstream sides, the upstream tubes 10 having similar transverse slots 17 in their downstream sides. The plates 16 have the rectangular openings 18 formed therein, the sides 19 of the openings having widths slightly greater than the width of the bar 12 which passes therethrough, and the sides 20 of the openings 18 having widths slightly less than that of its associated bar 12. The plates are slitted at 21 and 22 to form the spring tabs 23, the inner edges of which form sides 19 of the openings 18.

In assembling the plates 16 to one of the downstream bars 12, the downstream ends of the plates are placed in the slots 17 and the bar 12 is then forced through the openings 18 in the plates, the tabs 23 bending outwardly as illustrated by Fig. 6, and pressing tightly against the bars 12 thereby providing good electrical and mechanical contact between the plates and the bars. The edges of the bars 12 opposite the tabs 23 are forced tightly against the inner surfaces of the upstream sides of the tubes 10 thus providing good contact between the bars 12 and the tubes 10.

Figure 4:
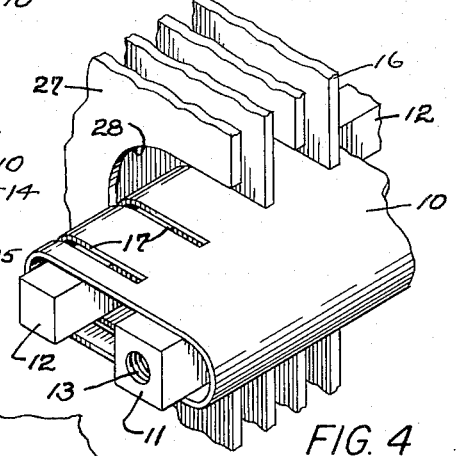
Fig. 4 is an enlarged, fractional, projected view illustrating one of the supports for the grounded collector plates.

Figs. 4, 5, and 6 illustrate the attachment of a bar 12 in a downstream tube 10 to a plurality of plates 16.

The upstream tubes 10 are similar to the downstream ones except that the bars 11 are adjacent the upstream sides, and the bars 12 are adjacent the downstream sides of the upstream tubes, and the slots 17 are formed in the downstream sides of the upstream tubes. The grounded collector plates 16 have openings 18 adjacent their upstream ends for receiving the tubes 10, and are assembled to the upstream bars 12 as described in the foregoing in connection with the downstream bars.

The tubes 25 which are similar to the tubes 10 except that they have less lengths so that they terminate short of the end plates 15, are supported by the tubular insulators 26 from the tubes 10. The tubes 25 contain bars 12 similar to the bars 12 in the tubes 10, and contain supporting bars 11 similar to the bars 11 in the tubes 10, but which however do not have the tapped openings 13 in their ends.

The insulated collector plates 27 have openings 18 therein corresponding to the openings 18 in the grounded collector plates 16, and are wedged against bars 12 in the tubes 25 as described in the foregoing in connection with the grounded collector plates 16 and the corresponding bars 12 in the tubes 10. The upstream tubes 25 have the bars 12 adjacent their downstream sides, and have the supporting bars 11 adjacent their upstream sides, and have the slots 17 in their downstream sides. The downstream bars 25 have the bars 12 adjacent their upstream sides, and have the supporting bars 11 adjacent their downstream sides, and have the slots 17 in their upstream sides. The plates 27 have the clearance openings 28 through which the tubes 10 pass, and the plates 16 have the corresponding clearance openings 29 through which the tubes 25 pass, the clearance openings providing air insulation around the tubes.

The end plates 15 which are connected mechanically and electrically to the tubes 10 and through same to the grounded collector plates 16, are adapted to be connected to the negative terminal of a suitable high voltage, direct current supply source. The tubes 25 and the insulated collector plates 16 which they support, are adapted to be connected to a positive terminal of the supply source which may be a +6,000 volt terminal. The insulators 26 and the clearance openings 28 and 29 are designed to provide adequate insulation between the two sets of collector plates and their supports.

The flattened, grounded tubes 10 and 25 which enclose the collector plate supports, not only offer less resistance to gas flow through the collector cell than the channel members formerly used, but are more easily cleaned when the collector plates are washed down with a liquid.

While one embodiment of the invention has been described for the purpose of illustration, it should be understood that the invention is not limited to the exact apparatus and arrangement of apparatus illustrated, as modifications thereof may be suggested by those skilled in the art, without departure from the essence of the invention.

What is claimed is:

1. A collector cell for an electrostatic precipitator comprising end plates, supporting bars interconnecting said end plates, a plurality of collector plates between said end plates, said collector plates having openings therein and having spring tabs formed therein with ends forming sides of the openings, wedging bars in said openings in contact with said tabs, and tubes, around said supporting and wedging bars, said tubes having transverse slots therein into which said collector plates extend.

2. A collector cell for an electrostatic precipitator comprising end plates, supporting bars interconnecting said end plates, a plurality of collector plates between said end plates, alternate of said collector plates having openings therein, wedging bars in said openings in contact with said alternate plates, tubes around said supporting and wedging bars, said tubes having transverse slots into which said alternate plates extend, the other collector plates having openings therein, other wedging bars in the openings in said other plates, in contact with said other plates, other tubes enclosing said other wedging bars, said other tubes having transverse slots therein into which said other plates extend, and insulators supporting said other tubes from said first mentioned tubes, said alternate plates having clearance openings around said other tubes, and said other plates having clearance openings around said first mentioned tubes.

3. A collector cell as claimed in claim 2 in which the collector plates have spring tabs formed therein, the ends of which form sides of the openings around the wedging bars, said ends contacting said spacer bars.

4. A collector cell for an electrostatic precipitator comprising end plates, a bar interconnecting said plates, a plurality of collector plates between said end plates, said collector plates having aligned openings therein, a wedging bar in said openings in contact with the sides thereof, and a flattened, sheet metal tube having rounded ends enclosing said bars, said tube having transverse slots therein in which said collector plates extend.

EARL L. RICHARDSON.

REFERENCES CITED

The following references are of record in the file of this patent:

UNITED STATES PATENTS

| Number | Name | Date |
|---|---|---|
| 1,357,466 | Moller | Nov. 2, 1920 |
| 1,697,316 | Horny | Jan. 1, 1929 |